(12) United States Patent
Rajagopalan et al.

(10) Patent No.: US 7,919,438 B2
(45) Date of Patent: Apr. 5, 2011

(54) METHOD AND SYSTEM FOR TREATING A METALWORKING OPERATION

(75) Inventors: Nanda Kishore Rajagopalan, Champaign, IL (US); Mark Greeley, Cincinnati, OH (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 579 days.

(21) Appl. No.: 11/364,852

(22) Filed: Feb. 28, 2006

(65) Prior Publication Data

US 2007/0199359 A1    Aug. 30, 2007

(51) Int. Cl.
   *C10M 173/00*    (2006.01)
   *C10M 177/00*    (2006.01)
(52) U.S. Cl. ......................................................... 508/110
(58) Field of Classification Search ................... 508/110
   See application file for complete search history.

(56) References Cited

U.S. PATENT DOCUMENTS

| 4,325,663 | A | * | 4/1982 | Lee | ................................ 409/136 |
| 5,716,917 | A | | 2/1998 | Williams et al. | |
| 6,551,969 | B2 | * | 4/2003 | Kato | ............................ 508/530 |

OTHER PUBLICATIONS

Machado, A.R., Wallbank, J., The effect of extremely low lubricant volumes in machining, Wear, vol. 210, No. 1-2, pp. 76-82, 1997.
Braga et al., Using a minimum quantity of lubricant (MQL) and a diamond coated tool in the drilling of aluminum-silicon alloys, Journal of Materials Processing Technology, vol. 122, pp. 127-138, 2002.
Misra, S.K., Skold, R.O., Phase and aggregational studies of some inversely soluble aqueous formulations Department of Applied Surace Chemistry, Chalmers University of Technology, SE-412 96 Gothenberg, Sweden, 2000.
Greeley, M., Rajagopalan, "Impact of Environmental Contaminants on Machining Properties of Metalworking Fluids", Illinois Waste Management and Research Center, 2003.
Greeley, M., Rajagopalan, N., "Impact of Environmental Contaminants on Machining Properties of Metalworking Fluids", Illinois Waste Management and Research Center, Champaign, IL, Tribology International 37 (2004) 327-332.
Greeley, M. H., DeVor, R. E., Kapoor, S. G., and Rajagopalan, N., 2003, "A Drilling-Based Methodology for Evaluating Changes in Metalworking Fluid Performance", Presented to NAMRC, 2003, 8 pp.

* cited by examiner

*Primary Examiner* — Glenn A Caldarola
*Assistant Examiner* — Taiwo Oladapo
(74) *Attorney, Agent, or Firm* — Greer, Burns & Crain Ltd.

(57) ABSTRACT

A method of cooling and lubricating an interface between a tool and a workpiece. A transiently stable emulsion is prepared including a water insoluble lubricant in water. The transiently stable emulsion, while stable, is introduced to the tool and/or the workpiece.

33 Claims, 8 Drawing Sheets

METHOD AND SYSTEM FOR TREATING A METALWORKING OPERATION

FIELD OF THE INVENTION

A field of the present invention is lubrication and cooling in metalworking. Still another field is the creation, use, and/or recovery of metalworking fluids.

BACKGROUND OF THE INVENTION

Lubrication and cooling of metalworking operations have been long standing problems for mechanized metalworking. Extreme heat and friction are generated in such operations and are reduced commonly by the application of metalworking fluids. Metalworking fluids typically provide cooling, lubrication, metal chip evacuation, and short-term corrosion protection. Thus, the machining of a metal part usually involves the use of a metalworking fluid.

Conventional metalworking fluids can be divided into four basic categories: straight oils, synthetics, semi-synthetics, and soluble oils. However, metalworking fluids in each of these categories have economic, health and safety, or environmental issues associated with their use.

SUMMARY OF THE INVENTION

The present invention provides methods and systems for cooling and lubrication of an interface between a tool and a workpiece during metalworking. In a preferred method, a transiently stable emulsion is prepared including a water insoluble lubricant and water. The transiently stable emulsion is introduced, while stable, to the machinery and/or the workpiece.

DETAILED DESCRIPTION

A problem associated with straight oils is limited cooling ability. Another problem is that, though straight oil can be misted to reduce lubricant use, this method is not compatible with most existing machining systems. Further, the oil mists created from misting are often unacceptable from a health and safety viewpoint, requiring solutions such as complete enclosure of the machine tool and/or stringent filtration requirements for aerosol.

The use of other metalworking fluids, such as synthetic metalworking fluids, semi-synthetics, and/or soluble oils creates a concern for removing organic constituents such as synthetic lubricants or surfactants from the water phase prior to disposal. Additionally, such metalworking fluids may present worker health problems associated with the chemical additives needed to produce a fluid or oil/water emulsion. Problems may also exist due to bacterial growth that commonly occurs in these products.

Particularly, metalworking fluids are a major source of oily wastewater in the effluents of industries in the metal products and machinery sector. It is estimated that about 1-2 billion gallons of oily wastewater result annually in the U.S. from the use of metalworking fluids. This creates both an environmental burden as well as significant disposal expenses for the metal products and machinery sector.

Increased attention is also being paid to the potential for contaminated metalworking fluids to have a negative health impact on persons working in the metal products and machinery sector. A specific, growing concern relates to possible exposure to pathogenic bacteria that may survive in metalworking fluid sumps and bacterial byproducts, including the possibility of allergenic reactions from exposure. There is also the concern of long-term exposure risks associated with the use and handling of biocides.

One way to reduce both health risks and expense is to purify the metalworking fluids. Conventionally, cartridge filtration, coalescers, and centrifugation are used to extend the working life of metalworking fluids. These conventional techniques are limited, however, in their capability to remove particulate matter of less than 10 μm, emulsified oil extraneous to native emulsion (referred to as tramp oil), and bacterial contamination.

Biocides represent another conventional technique to limit the bacterial contamination of metalworking fluids. However, the use of biocides for biological control is limited due to the potential for workers to have increased exposure to endotoxins. It is also limited by microbial adaptation, as the biocides can become ineffective over time.

It is desired in the metalworking field to provide a metalworking fluid that can provide lubrication, cooling, and/or debris removal for a metalworking operation, with at least adequate lubricating ability, but that potentially can avoid environmental or cost issues associated with conventional metalworking fluids. It is further desired to provide a method and system for lubricating and cooling a metalworking operation that can improve the disposal and/or reuse of metalworking fluids.

A preferred embodiment of the present invention utilizes a transiently stable emulsion including a water insoluble lubricant and water to cool and lubricate an interface between a tool and a workpiece. This transiently stable emulsion adds the cooling properties of the water to the lubricating properties of the water insoluble lubricant for use in a metalworking operation. The transiently stable emulsion preferably addresses the concerns of lubrication, excessive heat, and debris removal, among other possible benefits. The present inventors have discovered that transiently stable emulsions of a water insoluble lubricant and water may provide substantially equivalent lubrication properties to the fully formulated chemical emulsions currently used in the art. However, such transiently stable emulsions preferably have additional benefits when compared to conventional metalworking fluids.

For example, the chemistry of the transiently stable emulsions in preferred embodiments preferably is substantially simpler than conventional metalworking fluids, because such transiently stable emulsions preferably are limited in or devoid of strong emulsification agents that are high in biochemical oxygen demand (BOD), and lower in organic substrates promoting bacterial growth. Separation of the transiently stable emulsion into phases, such as the water insoluble lubricant phase ("lubricant phase") and water phase, is significantly easier in such two-phase transient emulsions. The ability to separate the lubricant and water phases will also allow much simpler purification schemes of the two phases if necessary. This is in contrast to much more difficult schemes required in the case of soluble oils and semi-synthetic metalworking fluids, where there is an overlap between the particle size of contaminants such as tramp oils and the intrinsic oil emulsions.

Providing the ability to separate the lubricant phase from the water phase overcomes these obstacles, because the bacteria and other water soluble contaminants are much larger than water molecules and are easily removed by filtration, adsorption, ion exchange, or other processes. Additionally, the water phase preferably includes very little organic material, so bacterial infestation may be naturally controlled without excessive recourse to biocides.

Oil-soluble contaminants such as hydraulic oils are substantially constituted of base oils and are not expected to interfere with the machining process within reasonable ranges. If necessary, these contaminants can be separated from the active water insoluble lubricant.

Preferred embodiments of the present invention provide a method and system of lubricating and cooling an interface between a tool and a workpiece. In an exemplary embodiment, a transiently stable emulsion including a water insoluble lubricant in water is prepared, and the transiently stable emulsion while stable is introduced (applied) to the interface. By "water insoluble" it is intended that the water insoluble lubricant have a water solubility of about 1% or less at room temperature (e.g., 75° F.), and in a preferred embodiment that a solution of the water insoluble lubricant in the water have a concentration, e.g., of <1000 ppm at room temperature. Within this larger range, as would be understood by those of ordinary skill in the art, solubilities of 0.1. %-1% would be considered slightly soluble, 0.01%-0.1% would be considered very slightly soluble, and <0.01% would be considered practically insoluble. In preferred embodiments, the water insolubility of the lubricant is contemplated to be within the practically insoluble range or the very slightly soluble range. Such water insoluble lubricants may be inherently insoluble, or they may be made insoluble by addition of destabilizers. The addition of destabilizers, for example, may allow the solubility of the lubricant to be within the slightly soluble range described above.

The water insoluble lubricant can include any liquid, solid, or gas having lubricating properties. Examples of water insoluble lubricants include, but are not limited to, water insoluble organic compounds or mixtures of water insoluble organic compounds of lubricating viscosity that reduce the friction between a tool and a workpiece (including natural substances or compounds or mixtures thereof, synthetic substances or compounds or mixtures thereof, or mixtures of natural substances or compounds and synthetic substances or compounds). More specific examples of water insoluble lubricants are provided in U.S. Pat. No. 5,716,917 to Williams et al., which is incorporated by reference herein. The lubricating ability of the lubricating agent can be characterized by any appropriate metric, such as cutting forces, tool life, tribological assessment, and/or chemical assessment.

Examples of solid lubricants include, but are not limited to, Molybdenum sulfide, graphite, glass, metallic iodides, chlorides, hydroxides and phosphates. Examples of gas lubricants include chlorinated organics such as, but not limited to, chloroform having lubricating properties.

The water used in the transiently stable emulsion may be any of various purity grades, including tap water. Preferably, however, the water should be as pure as necessary.

"Stable" as used in the context of a transiently stable emulsion refers to a condition in which the lubricating agent is present substantially as particles (including solid or gas particles or liquid droplets) distributed in a substantially uniform way from a volumetric sense (i.e., a substantially uniform volumetric dispersion) in the water. Suspended particles can vary in size from less than 1 micron, for example, to more than 1000 microns.

By "transiently stable" it is intended that the emulsion need only be stable during the time it is in contact with the workpiece or machinery, and thus needs to remain substantially stable from the time of preparation (e.g., mixing) to the time of application to the workpiece and/or machinery. This time may be on the order of seconds, for example, to significantly larger times, such as on the order of hours, days, or weeks, but not, say, on the order of months.

Preferably, no strong emulsifying agents are used, as they are preferably unnecessary, which results in dramatic reduction in bacterial growth. Bacterial growth in MWF has been a significant health and environmental concern in the art. Such bacterial growth has been a major biological hazard, and has been a major concern in the metalworking industry, both for the machinery operators and for the machinery. Preferably, removing the strong emulsion agents also provides simpler chemistry for the MWF. However, it is contemplated that emulsifiers may be added to a mixture provided they do not form stable emulsions beyond the transiently stable period as defined herein. Examples of potential emulsifiers include powders, solid particles, other lubricant additives, or corrosion inhibitors that may also provide some emulsification, if necessary.

A preferred method provides a water insoluble lubricant and water, and mixes the water insoluble lubricant and water to prepare the transiently stable emulsion. The transiently stable emulsion is introduced, while stable, to the metalworking machinery and/or the workpiece. The transiently stable emulsion may be collected after treating the metalworking machinery and/or workpiece, and the collected transiently stable emulsion may be separated into a lubricant phase and a water phase, for example for recovery or purification.

A system for treating metalworking machinery and/or a workpiece preferably comprises a preparer (e.g., a mixer or membrane emulsifier) of a water insoluble lubricant and water to form a transiently stable emulsion, and a supplier introducing the transiently stable emulsion, while stable, to the metalworking machinery and/or workpiece. Preferably, application of the transiently stable emulsion is compatible with existing metalworking fluid systems, though an apparatus or system may be customized.

A collector may also be provided for collecting the transiently stable emulsion and/or the water insoluble lubricant and water (if the emulsion has already begun to destabilize) after the transiently stable emulsion is introduced to the metalworking machinery and/or workpiece. Additionally, a separator may be provided for separating the collected transiently stable emulsion into the water insoluble lubricant (lubricant phase) and the water (water phase). An apparatus may also be provided for recovering the water insoluble lubricant and the water after separation, and for purifying the water insoluble lubricant and/or the water.

The water insoluble lubricant and the water may be stored or introduced to the machinery or the workpiece in combination or separately. The MWF including the water insoluble lubricant and the water may be prepared in several ways. Generally, any suitable method that results in the desired particle size may be used. To provide the MWF in some exemplary embodiments, the water insoluble lubricant and the water are mixed using any of a variety of methods. For example, the mixing operation may include mechanical mixing, circulation of the water insoluble lubricant and the water through a pump, and/or sonic mixing. Nonmixing emulsification methods may also be used, such as, but not limited to, membrane emulsification.

The mixing or other preparation, for example, provides a transiently stable emulsion. Mixing of the water insoluble lubricant and the water or other preparation to create the transiently stable state may occur immediately before supplying the mixed MWF to a metalworking operation, or it may occur at a period of time before supplying the fluid. The emulsion may be stable for a time on the order of seconds, minutes, days, weeks, or in between.

The present inventors have discovered that such transiently stable emulsions can operate adequately as MWF. Further, preferred embodiments of the inventive MWF have been found to outperform conventional, stable MWF in certain cases. Prior to the present invention, it was believed that MWF had to be stable emulsions, and thus emulsifers have been used to stabilize emulsions. By contrast, using the transiently stable emulsion provided in preferred embodiments of the present invention, the individual components can be stored separately before use if desired, mixed or otherwise prepared to create the transiently stable emulsion for use in metalworking, and then can be collected, separated into constituent components, and recovered.

After use in a metalworking operation, the MWF preferably can be separated into its components for recovery and storage, if desired. Once collected, the transiently stable MWF may be separated by gravity, chemical means, and/or by application of an external field, such as an electrical or magnetic field, or a centrifuge. Preferred MWFs have been shown to be easily destabilized using an external field. Separation using a centrifuge, for example, may take place on the order of minutes, while separation via gravity only may occur within a day. Other separation methods may be based on differences in additional physical properties. For example, preferential wetting, adsorption, absorption, charge, boiling point, diffusion, etc. are contemplated within this invention. Separations based on differential solubility are also contemplated within this invention.

The use of a transiently stable emulsion preferably allows easier recovery and cleaning of both the water insoluble lubricant and the water. Preferred compounds and processes enable easier separation of the water insoluble lubricant and the water, which allows simpler purification and reuse schemes, if desired. Apparatuses for mixing the water insoluble lubricant and the water to prepare the transiently stable emulsion for use in metalworking, for supplying the transiently stable emulsion to metalworking machinery, for collecting the MWF after use, for separating the components of the collected MWF into the lubricant phase and the water phase, and/or for recovering/purifying the separated components can be provided by supplementing and/or modifying existing factory or machine shop equipment. Accordingly, preferred systems for supplying an MWF to a metalworking operation and for collecting, separating, and recovering the MWF may be provided without significant additional costs from that of a conventional metalworking system, and may provide overall cost savings.

Figure 1:
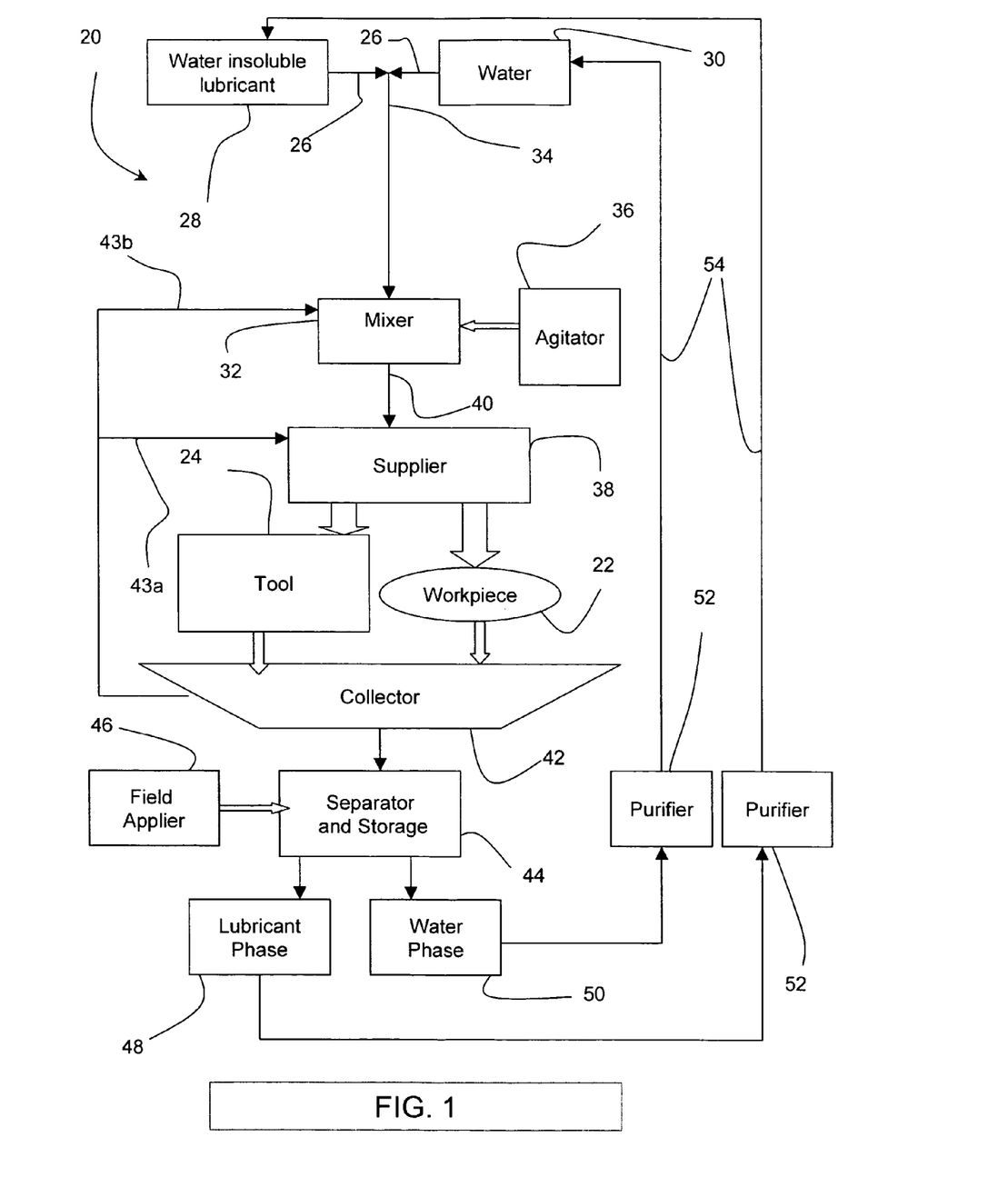
FIG. 1 is a diagram illustrating a fluid flow of a transiently stable emulsion and components thereof for treating metalworking machinery and/or a workpiece, according to a preferred embodiment of the present invention.

Referring now to the drawings, FIG. 1 illustrates a flow of a MWF within a metalworking system 20 used to operate on a workpiece 22. The metalworking operation in the metalworking system 20 may include any process or processes involving the alteration of metal, such as, but not limited to, metal cutting, metal forming, and metal removal. A tool 24 for performing the metalworking operation(s) is provided within the system 20, and such tools are known to those of ordinary skill in the art.

A system for treating the interface between the tool 24 and the workpiece 22 provides a MWF, which is a transiently stable emulsion, while stable, to the tool and/or the workpiece. For example, the exemplary MWF flow system of FIG. 1 includes a pair of separate supply lines 26 for the water insoluble lubricant and the water. The supply lines 26 preferably supply the water insoluble lubricant and the water within the metalworking system 20. The separate water insoluble lubricant and the water may be stored in suitable containers 28, 30 connected to the supply lines 26 before mixing. The supply lines 26 feed to a MWF preparer such as a mixer 32, for example via a line 34 having a common connection to both supply lines 26 and/or a storage vessel. Instead of separate lines for the water insoluble lubricant and the water, the water insoluble lubricant and the water in combined form may be introduced into the mixer 32 via a suitable supply line. Alternatively, the water insoluble lubricant and the water may be introduced to the mixer 32 separately. The concentration of the water insoluble lubricant within the water may vary from, for example, about 0.01% by volume to about 20% by volume. A preferred concentration of the water insoluble lubricant within the water is between about 0.1% and about 5% by volume.

Other components, such as additives, which may be lubricant soluble or water soluble, may be supplied via the lubricant line, the water line, and/or a combined line, and combined with the water insoluble lubricant and the water prior to the metalworking operation. Alternatively, the water insoluble lubricant, the water, and any additives may be combined in either tank 28, 30 before being supplied to the mixer 32.

In a preferred embodiment, the mixer 32 includes an agitator 36, which applies a turbulent agitation process to the mixer, thus creating a transient (temporary) well-dispersed emulsion of the water insoluble lubricant in the water. Alternatively or additionally, the mixer 32 may include any suitable apparatus for mechanical mixing or sonic mixing, and/or it may include a pump through which the water insoluble lubricant and the water are circulated. Any suitable method or apparatus may be used to produce the transiently stable emulsion that results in a desired particle size of the liquid, solid, or gaseous water insoluble lubricant within the water. Instead of mixing, other methods for preparing the transiently stable emulsion are contemplated, such as, but not limited to, membrane emulsification, and suitable apparatuses for such methods may be used in place of or in addition to the mixer 32 in the system 20 shown in FIG. 1.

The size of the particles of the water insoluble lubricant suspended in the transiently stable emulsion can vary from, for example, less than 1 micron to more than 1000 microns. However, a smaller particle size allows better access of the water insoluble lubricant to the metalworking operation, and also decreases the nonuniformity of the mixture. A preferred particle size, for example, is between about 0.1 micron to about 10 microns.

The combined water insoluble lubricant and water provide a transiently stable suspension when mixed that can be employed as a MWF to cool and lubricate the tool 24 and/or the workpiece 22. The transiently stable emulsion preferably also removes debris. In a preferred embodiment, the MWF is employed as a lubricant and coolant, and exhibits at least adequate lubricating ability, but can be separated into its various components after use. Though not required, the mixer 32 in exemplary embodiments may also provide storage for the water insoluble lubricant, the water, and any additives before mixing and/or may provide storage for the transiently stable emulsion after mixing.

A supplier 38 introduces the transiently stable emulsion, while it is stable (that is, when particles of the water insoluble lubricant are still substantially uniformly dispersed within the water), to the metalworking operation. This may include, for example, application of the transiently stable emulsion to the tool 24 and/or the workpiece 22 operated on (e.g., cut) by the tool. A supply line 40 preferably feeds into the supplier 38. The supply line 40 may feed from the mixer 32 as shown in FIG. 1, though the emulsion may instead be fed from a separate storage vessel (not shown) where it is stored before mixing. The supplier 38 may be any suitable fluid delivery system including, but not limited to, a device for flooding, for minimum quantity lubrication, for misting, for spraying, etc.

The transiently stable emulsion may be supplied to the tool 24 and/or the workpiece 22 by an external system, and/or it may be supplied by an existing MWF delivery system, which may be adapted by one or more components described herein. For example, a conventional metalworking system may be adapted by adding the water insoluble lubricant container 28 and the water container 30, the mixer 32, and the supply line 40 to the supplier 38. In another example, the mixer 32 may feed into a conventional supplier via the supply line 40 for distributing the emulsion to the metalworking system.

As described above, the suspension of particles within the emulsion may be transiently stable for any amount of time, for example a time less than one minute (e.g., on the order of seconds) to greater than one day (e.g., on the order of days or weeks). Thus, the amount of time between the operation of the mixer 32 and the supplier 38 can vary in different embodiments or for different emulsions. The unstable emulsion may be stored, for example, within the mixer 32 or another storage vessel after mixing and before supplying. It is also possible that the water insoluble lubricant and the water may be combined and mixed in a separate system or offsite, and delivered to the supplier 38 for treating the metalworking operation. The amount of time the emulsion can be stored in such a vessel may vary according to the amount of time the emulsion can remain stable at rest.

The MWF lubricates and cools the metalworking operation, though it may also perform other benefits, such as particle removal, chip removal, dust suppression, and/or corrosion inhibition. Examples of metalworking operations, and techniques for lubricating metalworking machinery and/or workpieces with a MWF are known to those of ordinary skill in the art.

In the exemplary embodiment of FIG. 1, a collector 42, such as a sump, collects the transiently stable emulsion after application to the tool/workpiece interface. The collector 42 may be part of an existing MWF collection system for a metalworking operation, or it may be a custom apparatus for receiving the MWF. If the contamination is low, the collected MWF may be returned to the supplier 38 for reuse via a return line 43a, if the transiently stable emulsion remains stable for that order of time. Alternatively, the collected MWF may be returned to the mixer via a return line 43b if desired to restabilize a partially destabilized emulsion. The collected MWF may also be returned to storage, awaiting future use with or without remixing, depending on the stability of the transiently stable emulsion. In particular embodiments of the system 20, an external system may be used for collection, if desired, and the external system may be individually configured for each metalworking operation. Alternatively, the collector 42 may be a central system for a metalworking facility.

If it is desired to destabilize the emulsion for purification, for example, the collector 42 preferably feeds into a separator 44. The separator 44 allows or forces the collected transiently stable emulsion to destabilize into the lubricant phase and the water phase. For example, the separator 44 may be simply a storage apparatus or location so that the transiently stable emulsion separates without further assistance (via gravity, for example). Alternatively or additionally, the separator 44 may include an applier of an external field 46 to the collected emulsion such as, but not limited to, a centrifuge, an electric field generator, a magnetic field generator, etc. In other embodiments, methods and suitable apparatuses for chemical separation or separation based on adsorption, absorption, wetting, charge, boiling point, diffusion, and/or differential solubility may be used.

After separation, a separated lubricant phase 48 and a water phase 50 may be returned, for example pumped, to the water insoluble lubricant storage 28 and the water storage 30, or may be fed directly to the mixer 32 for remixing and eventual reuse. As another possibility, the separated lubricant phase 48 and the water phase 50 may be directed away from the metalworking system 20. Alternatively or additionally, the lubricant phase 48 and the water phase 50 may be separated and treated, for example, by a purifier 52 to remove particulates, bacteria, etc. Examples of purification include, but are not limited to, filtration, adsorption, ion exchange, distillation, solvent extraction, crystallization, and other such unit operations. The treated lubricant phase and water phase may then be stored, fed back into the system 20 via recycling lines 54, or directed to other uses. Methods for treating a water insoluble lubricant and/or water will be understood by those of ordinary skill in the art.

Two exemplary systems are presented herein as examples of transiently stable emulsions of a water insoluble lubricant and water for use as a MWF. These experiments also provide a proof-of-concept that such transiently stable emulsions can act as adequate MWFs. The first example utilizes a conventional (stable) MWF rendered unstable by addition of multivalent cations. This emulsion was found to separate into two layers, a bottom water-rich layer and a top oil-rich layer. This provides, by definition, a two-phase mixture. On mixing, the exemplary two-phase mixture forms a transiently stable emulsion, which upon standing reverts back to the two-phase mixture.

The second exemplary MWF provides a formulated two-phase mixture that forms a transiently stable emulsion upon mixing (e.g., blending). In this exemplary MWF, a mixture of an extreme pressure additive (or EP) embodied in chlorinated paraffin and water is employed without additional components. This second exemplary MWF upon standing also separates into two phases.

The first exemplary MWF disclosed herein was provided first by modifying an existing MWF, TRIM E206, a soluble oil manufactured by Master Chemical Corporation, of Perrysburg, Ohio, in a dilutant water. In this experiment, TRIM E206 was diluted with water varying in hardness. Hardness in the form of Ca++ was added in concentrations of 0 mg/L, 100 mg/L, 300 mg/L, and 700 mg/L. These levels were chosen to be representative of the following: "no hardness", "medium hardness", "elevated hardness without oil loss", and "elevated hardness with emulsion split", respectively.

Figure 2:
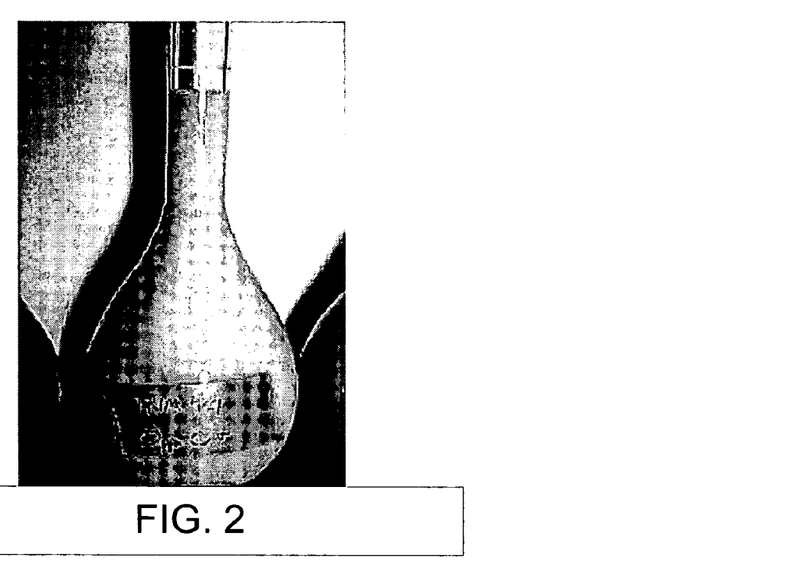
FIG. 2 shows soluble oil (TRIM E206) diluted with water.
Figure 3:
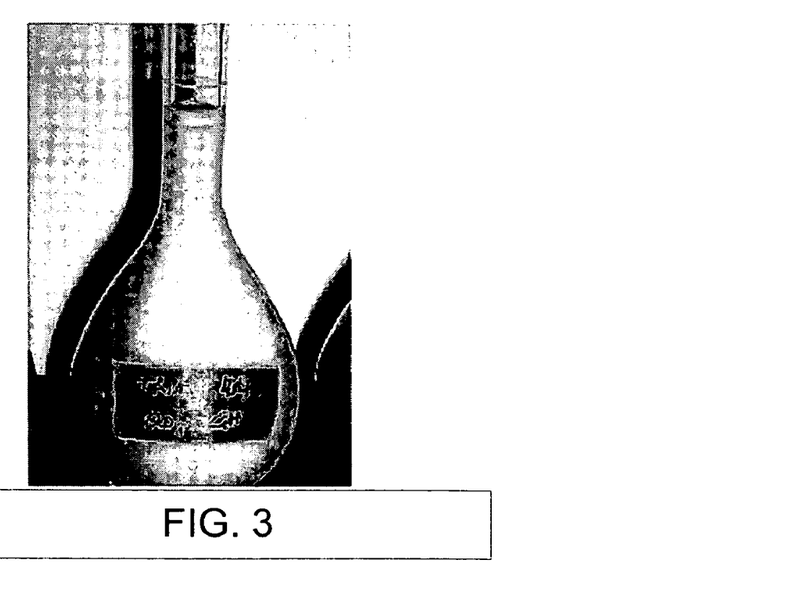
FIG. 3 shows TRIM E206 diluted with water and with added Ca++ ions in a concentration of 100 mg/L, according to an embodiment of the present invention.
Figure 4:
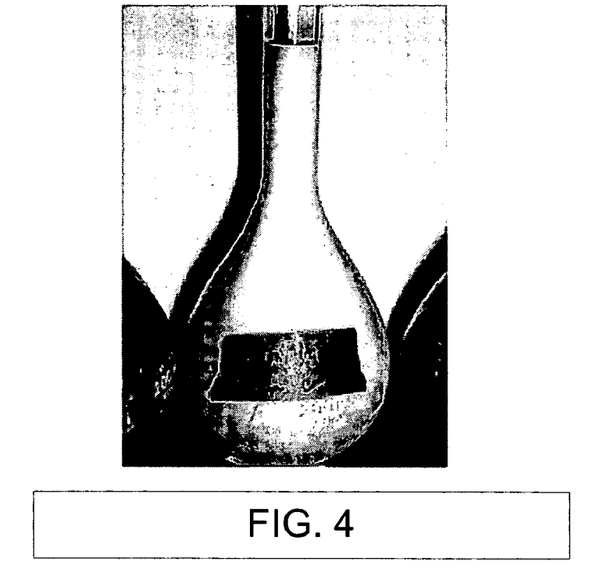
FIG. 4 shows TRIM E206 diluted with water and with added Ca++ ions in a concentration of 300 mg/L, according to an embodiment of the present invention.
Figure 5:
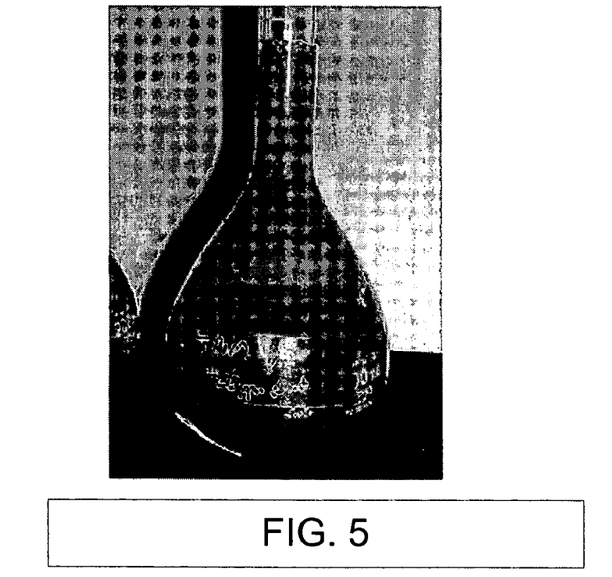
FIG. 5 shows TRIM E206 diluted with water and with added Ca++ ions in a concentration of 700 mg/L, according to an embodiment of the present invention.

All of the test MWFs were observed for a period of one week prior to testing. After three days, the 0 mg/L sample had no noticeable change, as shown in FIG. 2. The 100 mg/L sample had formed a thin layer of cream at its surface, as shown in FIG. 3, and appeared whiter and more opaque than the 0 mg/L sample. The 300 mg/L sample had no cream layer, but was more opaque than the 100 mg/L sample, as shown in FIG. 4. The 700 mg/L sample had split into three layers, as shown in FIG. 5. The bottom layer was translucent and light brown in color, followed by a layer of white cream, and a top layer of a light brown cream. No significant changes in appearance occurred after day 3.

One sample each of the 0 mg/L, 100 mg/L, and 300 mg/L MWF was evaluated. However, as the 700 mg/L MWF split into a multi-phase solution, it was evaluated twice, once after mixing the phases together, and once after removing the thicker, oil layer from the surface of the MWF. Though the 100 mg/L MWF formed a cream layer on its surface, this layer was not deemed to be a significant volume to merit testing the sample in two parts, as was done with the 700 mg/L sample.

The exemplary metalworking procedure used to test the sample MWFs was a drilling procedure described in Greeley et al., "A Drilling-Based Methodology for Evaluating Changes in Metalworking Fluid Performance", presented 2003, published 2004. This drilling procedure was employed to assess the relative lubricating functionalities of the five sample MWFs.

Figure 6:
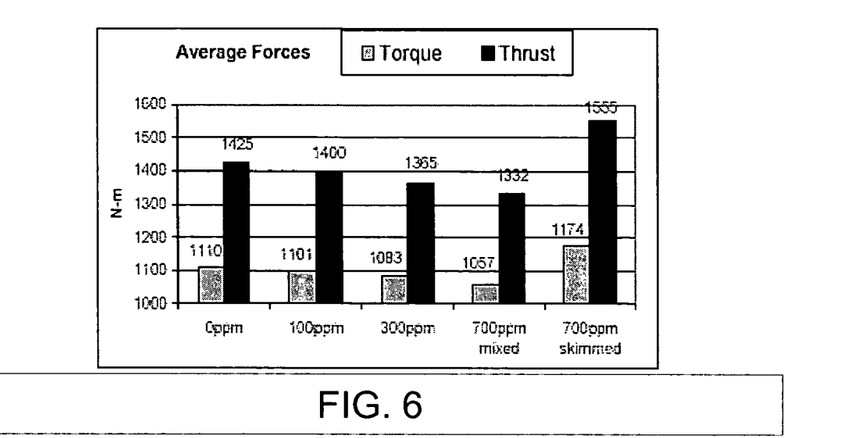
FIG. 6 is a graph showing average forces from drilling tests while Ca++ concentration varies in TRIM E206.

The five MWFs were tested in a random order for four replications, recording torque and thrust. It has been demonstrated through the Taylor Tool Life Equation that increased cutting forces are an indication of machining conditions which will result in lower tool life. The responses from the drilling assessments as the Ca++ concentration varies are shown in FIG. 6. The sample labeled "700 mg/L skimmed" represents the fluid that had been obtained after removing the oil layer that had separated. The sample layered "700 mg/L mixed" represents the sample after mixing the oil and water layers of the split emulsion.

As seen, the lubricant depleted sample exhibits (700 mg/L skimmed) the highest torque and thrust of all the fluids. On the other hand, the transiently stable emulsion sample (700 mg/L mixed) exhibits the lowest torque and thrust of all samples tested. Pair-wise analysis by student's t-test showed the 700 mg/L mixed sample to have significantly lower cutting forces than all samples except the sample containing 300 mg/L Ca++ (critical alpha of 0.05). Reviewing the torque and thrust results it is apparent that transiently stable emulsions formed by mixing can perform equivalently to stable emulsions. Accordingly, transiently stable emulsions can perform adequately as metalworking fluids, while still providing the potential to collect, separate, and recover the components of the emulsion.

In a second experiment, a MWF according to another exemplary embodiment of the present invention was formed by combining an EP additive embodied in a chlorinated paraffin, which in this experiment was Paroil 1057, manufactured by Dover Chemicals of Dover, Ohio, 56.85 Cl), with water. TRIM E206 has a similar chlorinated paraffin in its make-up as per MSDS information.

In one experiment, Paroil 1057, a chlorinated paraffin oil extreme pressure additive, manufactured by Dover Chemical Corporation, Dover, Ohio, was blended with deionized water at a concentration of 5% to provide a transiently stable emulsion. Immediately after mixing, the transiently stable emulsion was tested in an exemplary metalworking procedure as described in Greeley et al. TRIM E206 diluted with distilled water was tested as a reference.

Figure 7:
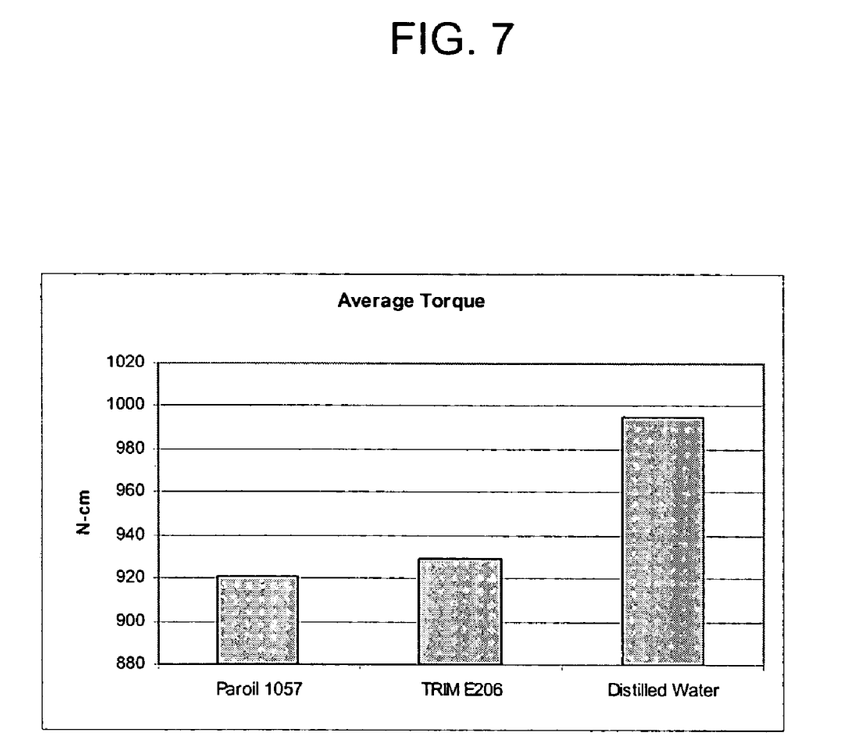
FIG. 7 is a graph showing average torque measurements for TRIM E206 and for a metalworking fluid provided by mixing Paroil 1057 and water, according to an embodiment of the present invention.
Figure 8:
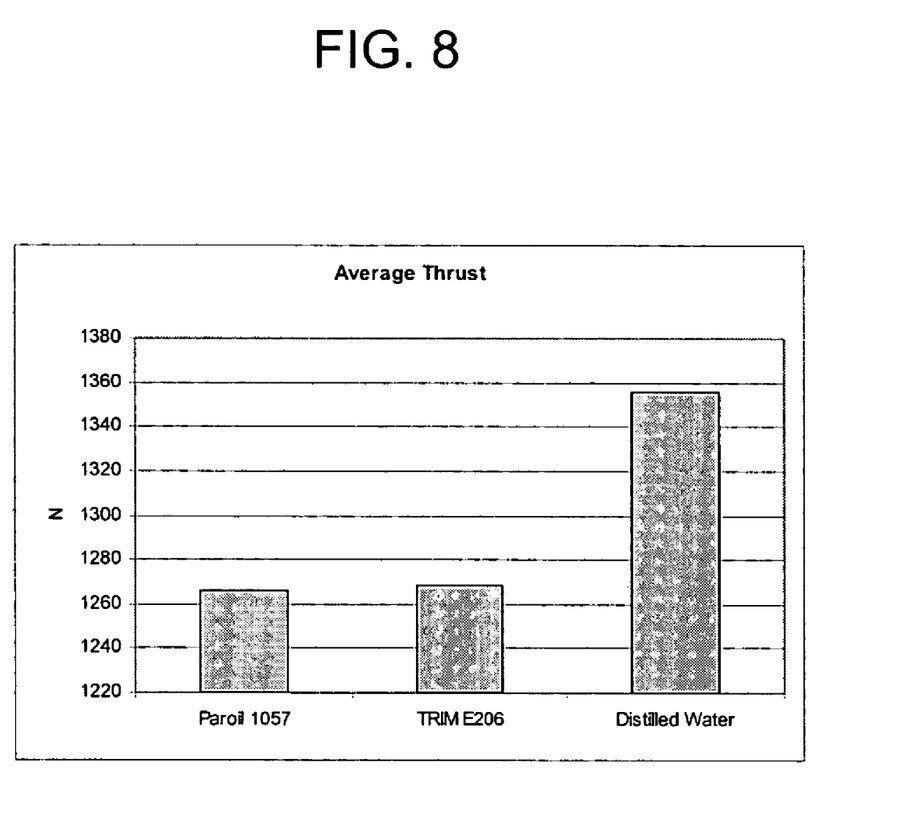
FIG. 8 is a graph showing average thrust measurements for TRIM E206 and for a metalworking fluid provided by mixing Paroil 1057 and water.

FIGS. 7 and 8 show average torque and thrust, respectively, for the Paroil 1057/water transiently stable emulsion and for TRIM E206. The torque and thrust results shown in FIGS. 7 and 8 indicate substantially equivalent performance between the Paroil 1057/water transiently stable emulsion and the TRIM E206 reference.

Literature supplied by Dover Chemical (Paroil's manufacturer) suggested that applicable concentrations could range from 5% to 20%. Therefore, another experiment assessed how the functionality of the EP (Paroil) will change over this suggested range. An additional Paroil concentration of 1% was evaluated as well.

Figure 9:
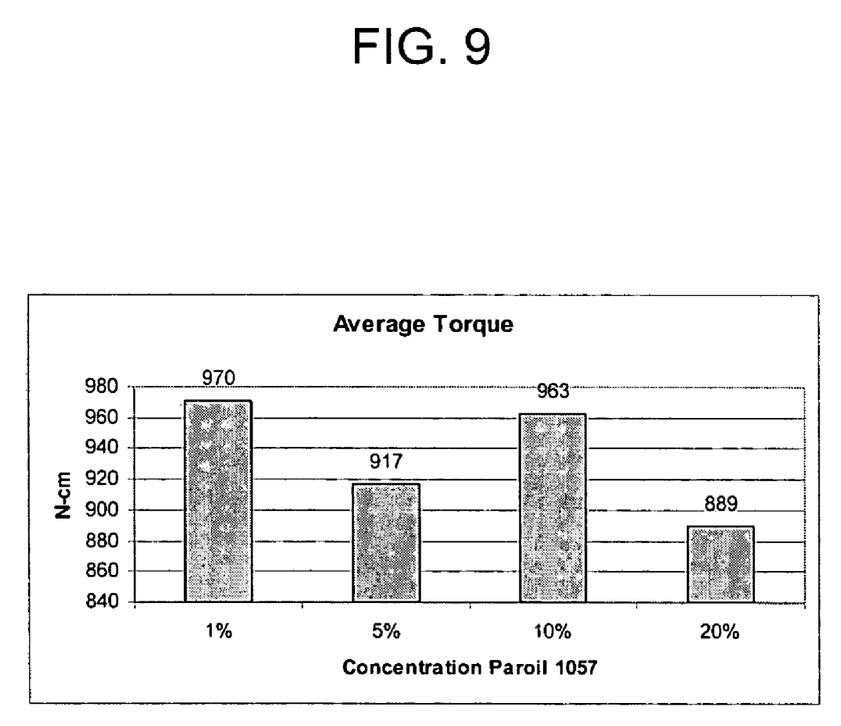
FIG. 9 is a graph showing average torque measurements as Paroil 1057 concentration varies in a metalworking fluid, according to embodiments of the present invention.
Figure 10:
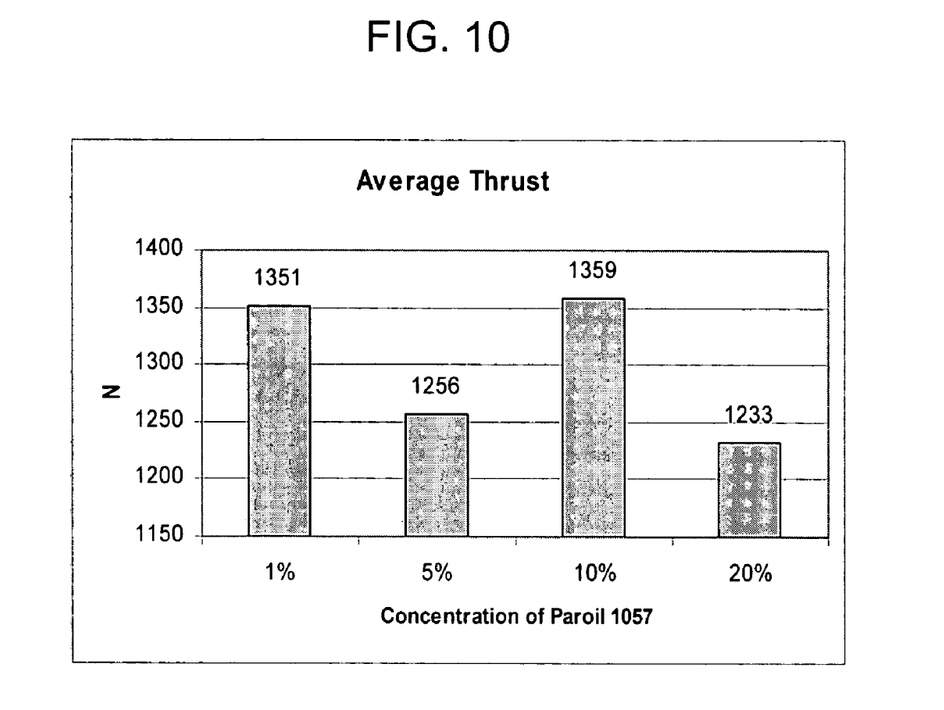
FIG. 10 is a graph showing average thrust measurements as Paroil 1057 concentration varies.

FIGS. 9 and 10 show average torque and thrust, respectively, as Paroil 1057 concentration in water varies between 1, 5, 10, and 20 percent. Statistical analysis of cutting force data by paired t-test showed the 5% and the 20% concentrations of Paroil 1057 to have lower required cutting forces than the 1% and the 10% concentration. The conclusion drawn from this experiment was that useful ranges of lubricating agent for the purposes of this invention can range broadly from about 1%-20% and depend on both the lubricating agent as well as the final application. For example, a light machining application might only require a 1% concentration of lubricating agent whereas a heavy machining application might require operation with a higher concentration of lubricating agent. Those skilled in the art will appreciate the necessity to balance the possibility of friction reduction with cooling and the necessity to optimize the working concentration of the transient emulsion in real-world applications.

The experiments described herein, through providing merely exemplary embodiments of the transiently stable (unstable) emulsion for use in metalworking, demonstrates that such emulsions can be utilized successfully to lubricate as effectively as chemical emulsions. It will be understood that parameters such as the ratio of lubricating agent to liquid for a particular metalworking operation, the degree of mixing required, the particular device or method of the separator 44, and possibly others may be varied for particular environments or components. The emulsions formed are easily destabilized by using an external field such as a centrifuge within 20 minutes or under gravity within a day.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the pending claims.

Various features of the invention are set forth in the appended claims.

What is claimed is:

1. A method of cooling and lubrication for an interface between a tool and a workpiece comprising:
   preparing a transiently stable emulsion including a water insoluble lubricant in water;
   introducing the transiently stable emulsion while stable to the tool and/or the workpiece;
   wherein a concentration of the water insoluble lubricant within the water is between about 0.01% by volume and about 20% by volume;
   wherein the prepared transiently stable emulsion remains stable for less than one day from a time of said preparing.

2. The method of claim 1 wherein said preparing comprises:
    providing the water insoluble lubricant and the water;
    mixing the water insoluble lubricant and the water to create the transiently stable emulsion.

3. The method of claim 1 wherein within the transiently stable emulsion the water insoluble lubricant forms particles in a substantially uniform volumetric distribution of a size between less than 1 micron and about 1000 microns.

4. The method of claim 3 wherein the particles are of a size between about 0.1 micron and about 10 microns.

5. The method of claim 1 wherein the transiently stable emulsion remains stable for a time on the order of minutes from the time of said preparing.

6. The method of claim 1 wherein said introducing comprises at least one of flooding, misting, and spraying.

7. The method of claim 1 further comprising:
    collecting the transiently stable emulsion after use in cooling and lubricating the metalworking machinery and/or workpiece;
    separating the collected transiently separated emulsion into the lubricating agent and the liquid.

8. The method of claim 7 wherein said separating comprises at least one of storing the collected transiently stable emulsion to allow gravity separation, chemically separating the water insoluble lubricant and the water, applying an external field to the transiently stable emulsion, and separating the water insoluble lubricant and the water based on differences in at least one of adsorption, absorption, differential solubility, wetting, boiling point, charge, and diffusion.

9. The method of claim 8 wherein said separating comprises employing at least one of a centrifuge, an electric field generator, and a magnetic field generator.

10. A system for cooling and lubricating metalworking machinery and/or a workpiece comprising:
    a provider of a transiently stable emulsion including a water insoluble lubricant in water, wherein a concentration of the water insoluble lubricant within the water is between about 0.01% by volume and about 20% by volume, wherein the transiently stable emulsion remains stable for less than one day from a time the transiently stable emulsion is provided;
    a supplier introducing the transiently stable emulsion while stable to the metalworking machinery and/or workpiece.

11. The system of claim 10 wherein said provider comprises at least one of a mixer for mixing the water insoluble lubricant and the water and a membrane emulsifier;
    wherein the transiently stable emulsion remains stable for less than one day from a time the transiently stable emulsion is mixed or emulsified.

12. The system of claim 10 wherein said provider comprises a mixer, and wherein the mixer comprises at least one of a pump, a sonic mixer, and a mechanical mixer;
    wherein the transiently stable emulsion remains stable for less than one day from a time the transiently stable emulsion is mixed.

13. The system of claim 10 wherein said supplier comprises at least one of a device for flooding, a device for minimum quantity lubrication, and a device for spraying.

14. The system of claim 10 further comprising:
    a collector for collecting the transiently stable emulsion after the transiently stable emulsion is supplied to the metalworking machinery and/or workpiece.

15. The system of claim 14 further comprising:
    a separator for separating the collected transiently stable emulsion into a lubricant phase and a water phase.

16. The system of claim 15 wherein said separator comprises at least one of a storage vessel, a chemical separator, a centrifuge, a magnetic field applier, and a separator configured to separate the water insoluble lubricant and the water based on differences in at least one of adsorption, absorption, differential solubility, wetting, boiling point, charge, and diffusion.

17. The system of claim 15 further comprising:
    an apparatus for recovering the water soluble lubricant and the water after separation.

18. The system of claim 15 further comprising:
    an apparatus for recycling the water soluble lubricant and the water after separation for reuse by said provider and said supplier.

19. A method of cooling and lubrication for an interface between a tool and a workpiece during a metalworking operation comprising:
    preparing a transiently stable emulsion including a water insoluble lubricant in water, wherein a concentration of the water insoluble lubricant within the water is between about 0.01% by volume and about 20% by volume, wherein the prepared transiently stable emulsion remains stable for less than one day from a time of said preparing;
    introducing the transiently stable emulsion while stable to the tool and/or the workpiece;
    collecting the transiently stable emulsion after said introducing;
    separating the collected transiently stable emulsion into a lubricant phase and a water phase.

20. The method of claim 19 wherein said collecting the transiently stable emulsion further comprises collecting at least one of water and water insoluble lubricant that has separated from the transiently stable emulsion.

21. The method of claim 19 wherein said preparing comprises mixing the water and the water insoluble lubricant to provide particles of the water insoluble lubricant in substantially uniform suspension within the water.

22. The method of claim 21 wherein the particles are substantially within a predetermined range of sizes.

23. The method of claim 21 wherein said preparing comprises at least one of mechanical mixing, circulation of the water insoluble lubricant and the water through a pump, sonic mixing, and membrane emulsification.

24. The method of claim 19 further comprising:
    after said preparing and before said introducing, storing the prepared transiently stable emulsion for a period of time.

25. The method of claim 24 wherein the period of time is on the order of hours.

26. The method of claim 19 wherein said introducing comprises employing a fluid delivery system.

27. The method of claim 26 wherein the fluid delivery system comprises at least one of a device for flooding, a device for minimum quantity lubrication, and a device for spraying.

28. The method of claim 19 wherein said separating comprises at least one of storing the collected transiently stable emulsion to allow gravity separation, chemically separating the water insoluble lubricant and the water, applying an external field to the transiently stable emulsion, and separating the water insoluble lubricant and the water based on differences in at least one of adsorption, absorption, differential solubility, wetting, boiling point, charge, and diffusion.

29. The method of claim 19 wherein said separating comprises employing at least one of a centrifuge, an electric field generator, and a magnetic field generator.

30. The method of claim 19 further comprising:

purifying at least one of the separated lubricant phase and the water phase.

31. The method of claim 30 wherein said purifying comprises at least one of filtering, adsorption, ion exchange, distillation, solvent extraction, and crystallization.

32. The method of claim 1, wherein the transiently stable emulsion remains stable for a time on the order of seconds from the time of said preparing.

33. The method of claim 1, wherein said prepared transiently stable emulsion does not comprise an emulsifier.

* * * * *